United States Patent [19]

Santoro

[11] 4,301,483
[45] Nov. 17, 1981

[54] UNIT FOR TRANSMITTING THE MOVEMENT OF A MOTOR TO THE CASSETTE SPOOL DRIVING GEARS IN A CASSETTE TAPE RECORDER

[76] Inventor: Giovanni Santoro, Via Campo di Mele 55, Roma, Italy

[21] Appl. No.: 67,421

[22] Filed: Aug. 17, 1979

[30] Foreign Application Priority Data

Aug. 22, 1978 [IT] Italy .................................. 50818 A/78

[51] Int. Cl.³ ...................... G11B 15/22; G11B 15/26
[52] U.S. Cl. .................................. 360/96.3; 242/204; 360/90; 360/105
[58] Field of Search .................. 360/96.3, 96.1, 90, 360/74.1, 73, 72.2, 105; 242/201, 204, 206–210

[56] References Cited

U.S. PATENT DOCUMENTS

| | | | |
|---|---|---|---|
| 3,550,983 | 12/1970 | Probst | 360/105 |
| 3,550,984 | 12/1970 | Moore | 360/90 |
| 3,842,432 | 10/1974 | Lemelson | 360/105 |
| 3,930,268 | 12/1975 | Uemura | 360/96.3 |
| 3,965,483 | 6/1976 | Katoh et al. | 360/90 |
| 4,080,638 | 3/1978 | Platt | 360/105 |
| 4,131,922 | 12/1978 | Yoshida et al. | 360/105 |
| 4,149,202 | 4/1979 | Terada et al. | 360/90 |

*Primary Examiner*—Alfred H. Eddleman
*Attorney, Agent, or Firm*—DeLio and Montgomery

[57] ABSTRACT

A unit for transmitting the movement of a motor to the cassette spool driving gears in an autoreverse cassette tape recorder is disclosed comprising a drive mechanism automatically operating in normal forward and reverse and in fast forward and rewind both for normal forward and reverse operations and a braking mechanism adapted to automatically brake both in normal forward and in reverse and in fast forward and rewind. The drive mechanism has first and second double gears carried by a movable support, an operation lever for the support, a control mechanism for the operation level, and a transmission output mechanism. The braking mechanism has an elastic plate pivoted in the middle between two cassette spool driving gears and a disc pivoted with the plate.

7 Claims, 12 Drawing Figures

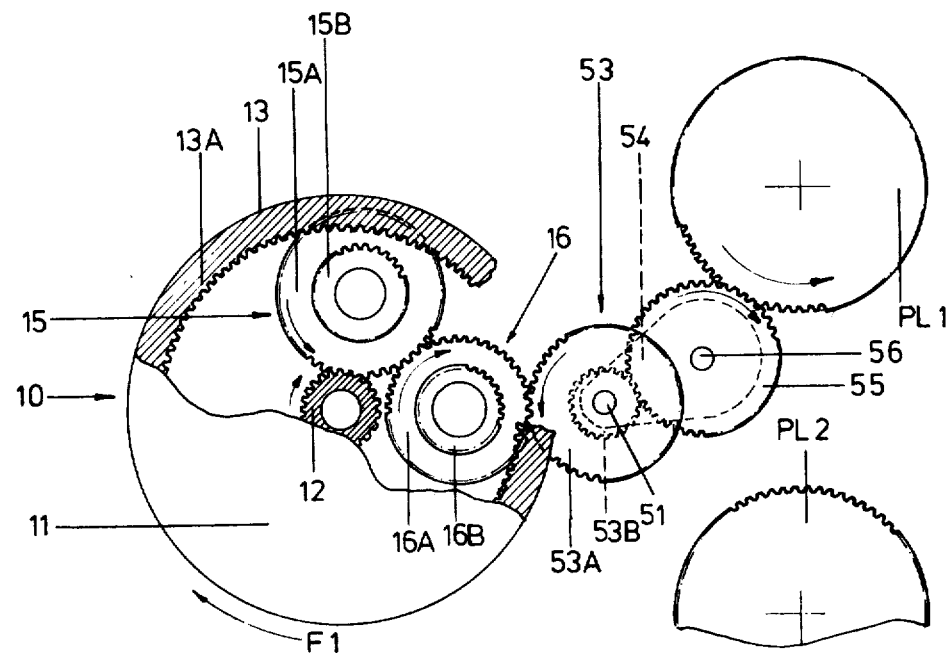
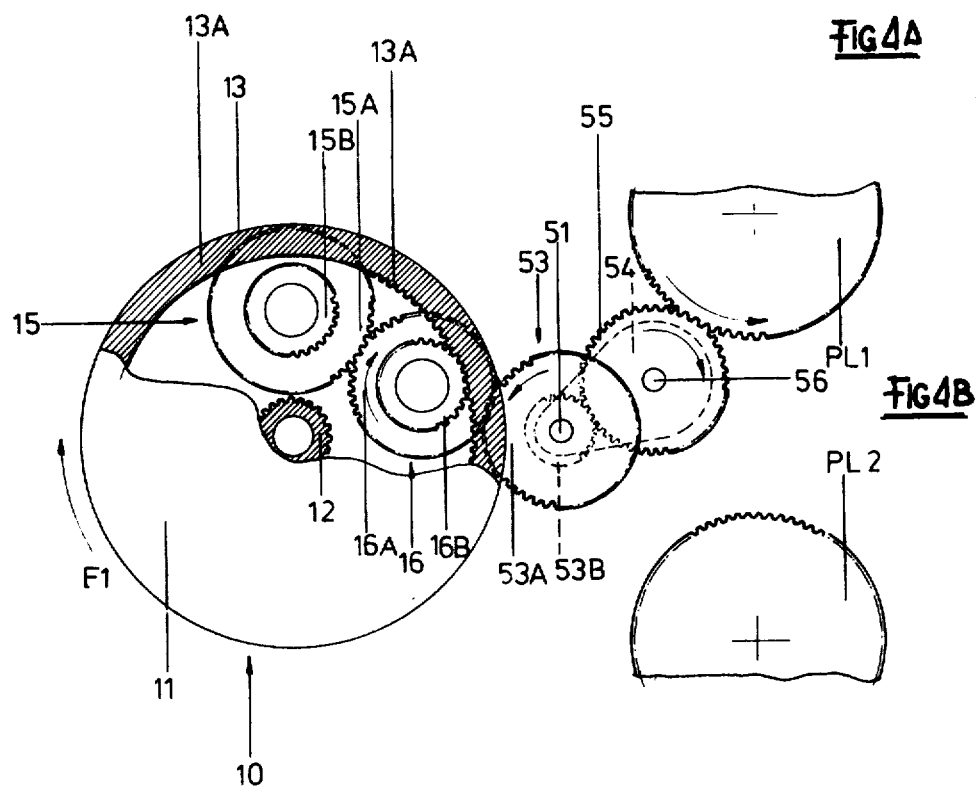
FIG 4A
FIG 4B

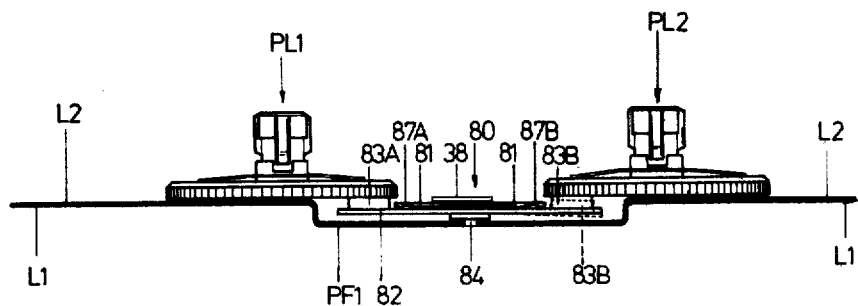
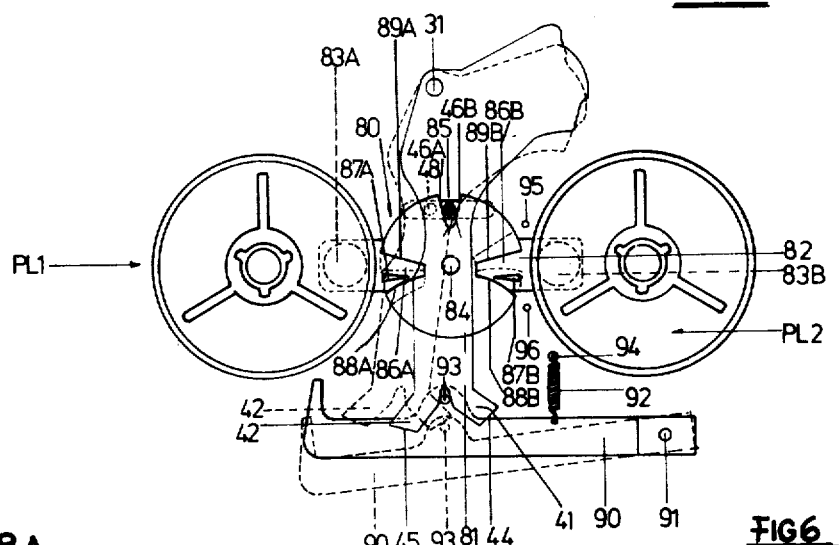
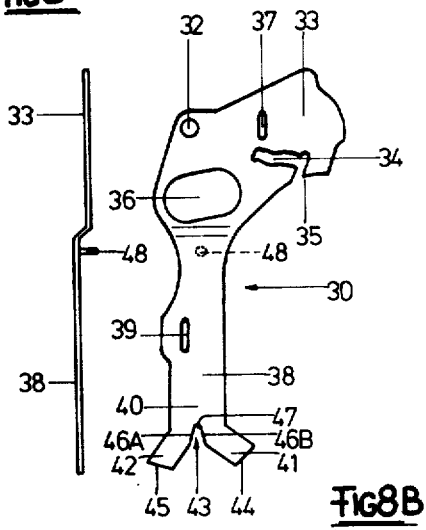
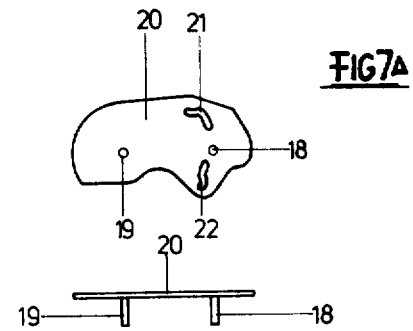

UNIT FOR TRANSMITTING THE MOVEMENT OF A MOTOR TO THE CASSETTE SPOOL DRIVING GEARS IN A CASSETTE TAPE RECORDER

This invention refers to cassette tape recorders provided with automatic reverse and more particularly to cassette tape recorders of this type associated to car radio sets.

More particularly this invention provides a unit for transmitting the movement of a motor to the cassette spool driving gears in a cassette tape recorder. This unit also comprises a braking device for these cassette spool driving gears.

As it is known, there is at present an increasingly wider tendency to use the cassette tape recorders having the automatic reverse of the tape movement direction.

In these cassette tape recorders, called recorders with "autoreverse", once the tape is completely unwound from one of the spools, the tape movement direction is automatically reversed and the tape is thus rewound on the spool from which it has been completely unwound. Evidently this operation does not cause the recorder to stop upon changing the tape movement direction. Thus, the cassette recorder continues either the playback of what is recorded on the tape or the recording thereon. Of course, after this change of direction of the tape movement both the playback and the recording are performed on the other two tracks of the tape.

It is evident that these cassette tape recorders with autoreverse are also provided with the fast forward and rewind operations, necessary to move quickly a length of tape to a position adjacent to the head (either the reading or the recording head), which length of tape is either downstream or upstream of the length of tape being adjacent to the stream of the length of tape being adjacent to the head in the tape movement direction at that moment.

It is evident that in cassette tape recorders with autoreverse both the fast forward and rewind operations are not absolute concepts (as in the case of conventional cassette tape recorders), but they have a meaning only if referred to the tape movement direction upon operation of the respective control push key.

For example, the fast forward operation according to the play-back of tracks 1 and 2, where the tape movement is performed from right to left for a hypothetical observer viewing the tape from top of the magnetic head, will occur in the opposite direction in respect of the fast forward operation according to tracks 3 and 4, where the tape movement is performed from left to right for the same hypothetical observer. The same is true for the fast rewind operation.

It will be evident that the provision of a complete fast forward and rewind unit, i.e. a unit comprising both the transmission device establishing the speed of rotation and the direction thereof (according to the tape movement direction at that moment) and the operation mechanism therefor, is not easy, particularly where the space available is very reduced as in the case of cassette tape recorders for car radio sets.

Accordingly, it is a general object of the invention to provide a complete unit for transmitting the movement of a motor to the cassette spool driving gears and for the fast forward and rewind operations in cassette tape recorders, which unit is operative independently of the tape movement direction at that moment.

A further object of the invention is to provide a unit of the above-mentioned type that is simple, reliable and has low manufacturing costs.

It is still a further object of the invention to provide a unit of the above-mentioned type that is also compact and makes use of the space that normally is not used.

Finally, it is a further object of the invention to provide a unit of the above-mentioned type comprising an automatic braking device for the cassette spool driving gear.

The above objects are accomplished using a flywheel of a new type, through a series of gears, a part of which is received in the thickness of the flywheel transmitting the rotary movement, and the suitable support, operation and control members therefor and through a braking device associated to the operation member.

According to the invention, the above flywheel comprises a disk having a central pin or hub and a thicker peripheral circular rim both integral with one of the disk faces.

The hub comprises a pinion and also the inner cylindrical surface of the circular rim is toothed. Thus, the teeth are spaced and facing one another so that a free space having the shape of a circular crown is formed therebetween. This space is defined on three sides, i.e. from the inner face of the disk in the axial direction, the inner teeth of the peripheral circular rim or ring gear and the outer teeth of the hub in the radial direction, the space being axially open and accessible from the opposite side of the disk.

A portion of two double gear wheels mounted on a movable flat support is received in the space thus formed within the flywheel body. The positions of the movable flat support are controlled by an operation lever controlled in turn by the control mechanism.

The arrangement is such that the rotary motion for the normal tape movement is transmitted by the hub of the flywheel by approaching one of the gear wheels thereto so as to have a given gear ratio; the rotary motion for the fast forward operation is transmitted by the ring gear to one of the two gears and the rotary motion for the fast rewind operation is also transmitted by the ring gear but to the other of the two gears.

In all this cases the normal forward, fast forward and fast rewind are referred to the direction of rotation of the flywheel.

Furthermore, the braking device is associated to the operation lever to be operated by the positions thereof.

The invention will be now described in detail with reference to the annexed drawings, wherein:

FIG. 3 is a vertical sectional view of the unit of FIGS. 1 and 2;

FIG. 4A is a schematic plan view of the unit in the arrangement for the normal forward operation;

FIG. 4B is a similar view of the unit in the arrangement for the fast forward operation;

FIG. 5 is a side elevation view of the braking device;

FIG. 6 is a top view of the device of FIG. 5;

FIGS. 7A and 7B are top and side views, respectively, of the flat support of the unit; and FIGS. 8A and 8B are similar views of the operation lever of the flat support of FIGS. 7A and 7B.

Figure 1:
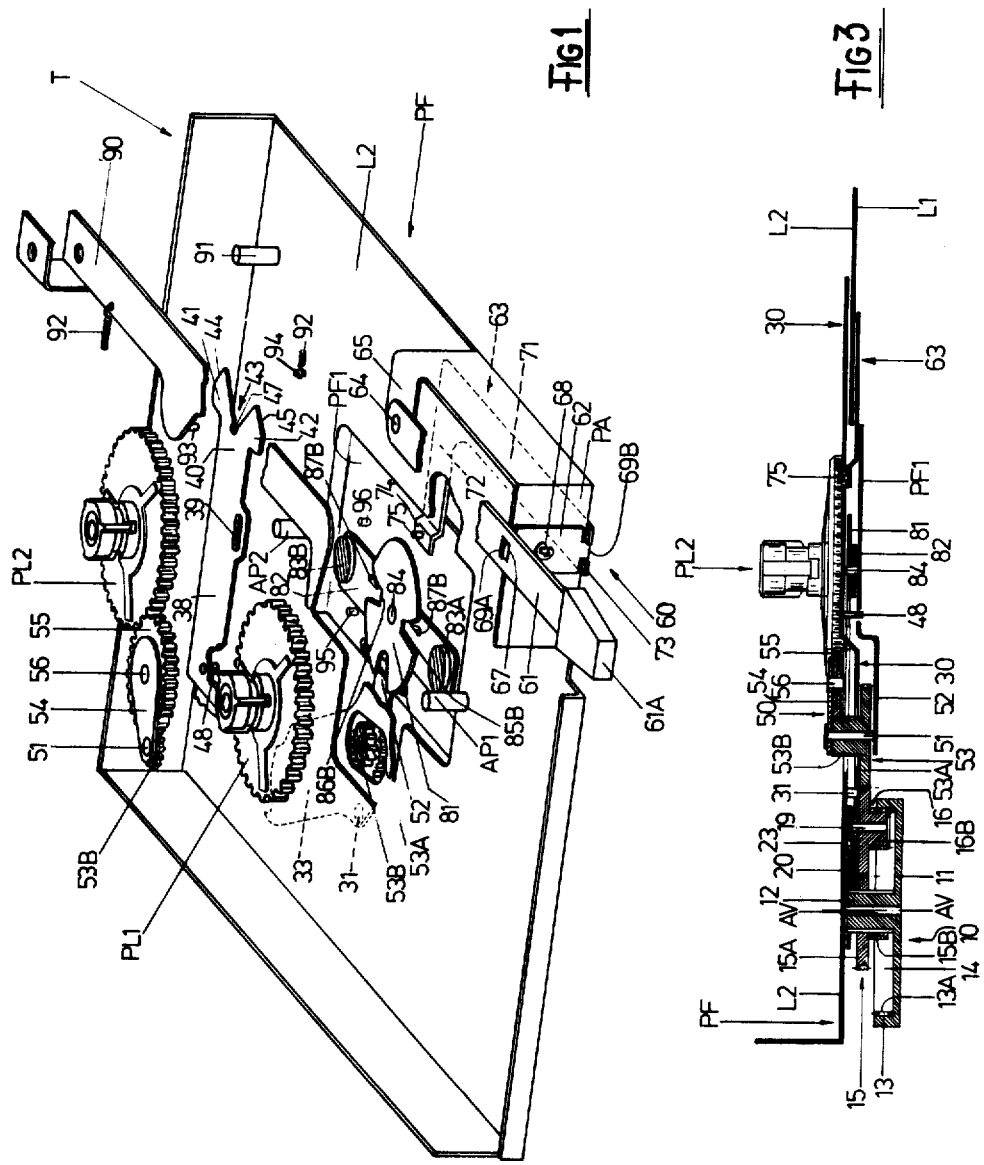
FIG. 1 is an exploded perspective top view of the unit according to the invention, with parts cut-away or omitted.

Particularly with reference to FIGS. 1 to 4C, the transmission unit according to the invention essentially comprises a suitably hollow flywheel 10, two double gears 15 and 16, permanently meshed with each other, a flat support 20 for gears 15 and 16, a control lever 30, a "transmission output device" 50, a control mechanism 60 for the movement of the cassette spool driving gears and a braking device 80. The unit is supported, as it will be described hereinafter, by a frame T of the cassette tape recorder and more particularly by faces L1 and L2 of bottom wall PF and from wall PA thereof.

Furthermore, the unit cooperates with an oscillating support 90 pivoted on a pin 91 integral with inner side L2 of bottom wall PF and biassed by a spring 92, as it will be described in more detail hereinafter.

Figure 2:
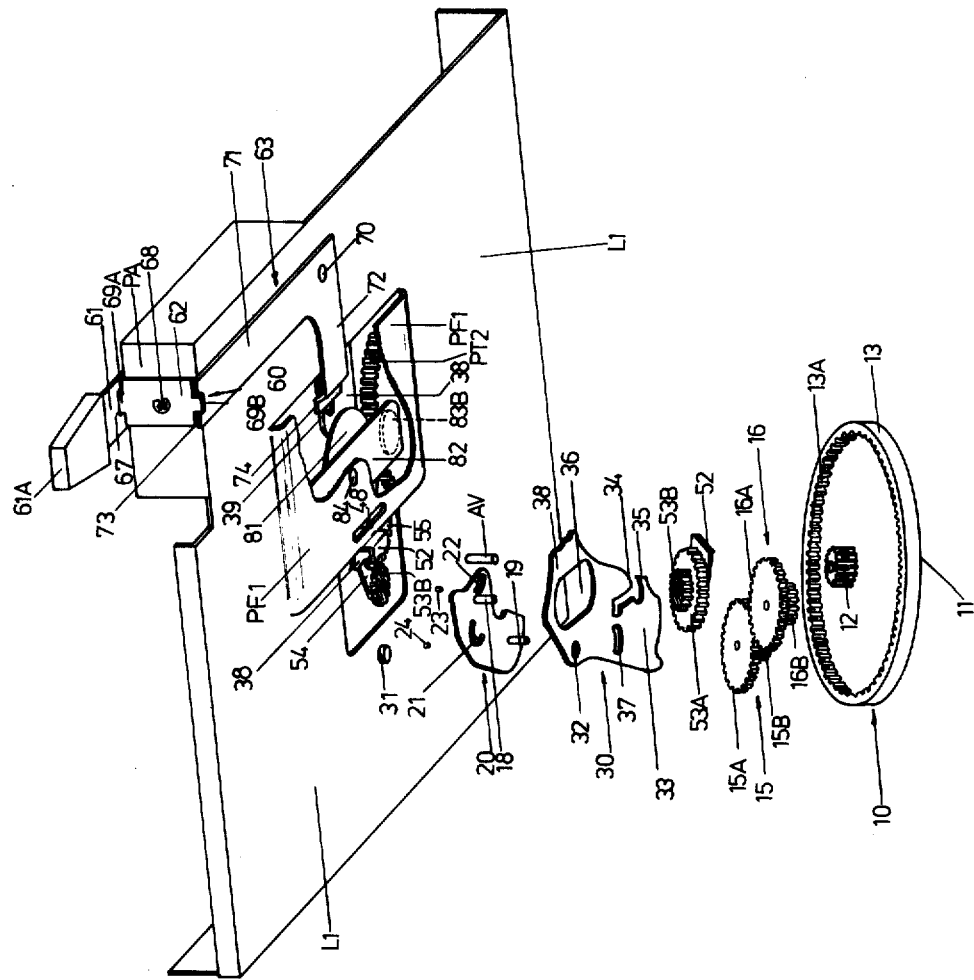
FIG. 2 is a similar view from the bottom.

Particularly with reference to FIG. 2, flywheel 10 is supported by an axis AV integral with outer face L1 of bottom wall PF of the tape recorder so as to be at a certain distance therefrom. Double gears 15 and 16 are supported by axes 18 and 19 integral with flat support 20 so as to be at a certain distance therefrom. Control lever 30 passes through bottom wall PF of frame T having shank portion 38 along inner face L1 of bottom wall PF and head 33 along outer face L2 of the latter, head 33 being pivoted thereon through pin 31 received within corresponding hole 32 on head 33. Head 33 is arranged between flat support 20 and double gears 15 and 16 with axes 18 and 19 passing through slots 34 and 37 formed therein.

Control lever 30 has a fork-shaped end 40 adapted to cooperate with a pin 93 carried by oscillating support 90 that also carries the reading and recording magnetic heads and the pinch roller adapted to cooperate with the capstan of the tape recorder (not shown).

Transmission output device 50, adapted to suitably transmit the movement of flywheel 10 to cassette spool driving gears PL1 and PL2, is supported by an axis 51 carried by offset portion 52 of bottom wall PF (FIG. 3).

Control mechanism 60 essentially comprises three levers articulated with each other and pivoted on frame T of the tape recorder, these levers being indicated by reference numbers 61, 62 and 63, respectively.

Flywheel 10 (FIGS. 2 and 3) comprises a lower disk 11 having a central toothed hub 12 and a peripheral circular rim or ring gear 13 having inwardly directed teeth 13A. It should be noted that the axial dimension of toothed hub 12 is larger than the dimension of peripheral rim 13.

Double gears 15 and 16 are identical with each other and comprise a base gear wheel 15A (16A, respectively) and a pinion of smaller diameter 15B (16B, respectively) integral therewith.

It should be noted (FIG. 3) that base gear wheels 15A and 16A are supported by respective axes 18 and 19 so as to be meshed with each other and outwardly (above in FIG. 3) of the lower edge of circular rim 13 beyond which toothed hub 13 of flywheel 10 protrudes, while pinions 15B and 16B are received within space 14 under disk 11 between toothed hub 12 and circular rim 13.

Flat support 20 comprises, besides axes 18 and 19, two arcuated slots 21 and 22 adjacent to axis 18 and receiving pins 23 and 24 integral with outer face L1 of bottom wall PF (FIGS. 7A, 7B and 2).

Head 33 of control lever 30 comprises hole 32 and open slot 34, extending from edge 35 thereof, and also a large opening 36 having rounded ends and a slot 37, while elongated portion 38 of lever 30 has a slot 39 parallel to the longitudinal axis thereof (FIG. 1).

End 40 of lever 30 is forked having two arms 41 and 42 with a V-shaped notch 43 therebetween, arms 41 and 42 having each a rectilinear end edge 44 and 45, respectively.

Transmission output device 50 for transmitting the movement of the motor comprises a double gear 53 comprising a base gear wheel 53A and a pinion 53B integral therewith, a flat support 54 pivotally fitted over pin 51 and a gear 55 mounted on an axis 56 carried by flat support 54. The position of axis 56 is such that gear 55 is always meshed with pinion 53B, while the position of axis or pin 51 (FIG. 3) is such that gear wheel 53A supported thereby is always meshed with gear wheel 16A of double gear 16.

It should be noted that, due to the complexity of the structure and arrangement of the parts, some components have been "split" in FIGS. 1 and 2 and the parts cut-away are shown in exploded view, as for example pinion 53B passing through window 36 of lever 30.

Lever 61 (FIG. 2) of control mechanism 60 is pivoted at one end, through pin 64, on a horizontal tab 65 integral with right side wall PL of frame T of the tape recorder and it comprises a head 61A and a rectangular opening 67 at the other end.

Lever 62 (FIGS. 1 and 2) is pivoted at its centre on front wall PA of frame T through pin 68 and comprises a protruding tooth at each end, these teeth being indicated by reference numbers 69A and 69B.

Finally, lever 63 (FIG. 1) is pivoted on outer face L1 of bottom wall PF through pin 70. This lever 63 is L-shaped having two arms 71 and 72 arranged at right angle. End 73 of arm 71 is forked, while end 74 of arm 72 has an upwardly directed pin 75.

The above-described three levers are articulated in respect to each other through lever 62, upper tooth 69A of which is received within opening 67 while lower tooth 69B is engaged with forked end 73 of L-shaped lever 63. Furthermore, lever 63 controls the position of lever 30 through pin 75 being fitted in slot 39 of portion 38 thereof.

Braking device 80 is supported by inner face L2 of bottom wall PF, being particularly received in a cavity PF1 formed therein, and essentially comprises a conditioning disk 81, a brake applying plate 82 and two braking pads 83A and 83B.

More particularly, conditioning disk 81 is pivotally supported by pin 84 carried by cavity PF1 of bottom wall PF so as to rotate in both directions, disk 81 comprising a narrow radial opening 85 and two opposite radial openings 86A and 86B having a larger angular dimension.

Brake applying plate 82 is also pivotally supported by pin 84 so as to rotate freely also in respect of overlying disk 81 and this plate 82 comprises two conical embossments 87A and 87B on the upper face thereof, these embossments being normally placed within windows 86A and 86B of disk 81.

It should be noted that arcuated edges 88A and 88B of windows 86A and 86B of disk 81 are not parallel to the outer generating lines of corresponding conical embossments 87A and 87B which, furthermore, are more adjacent to these edges than to the opposite edges indicated by references 89A and 89B (FIG. 6).

Plate 82 is elastic and the side arms thereof are slightly raised so that pads 83A and 83B, which are of a soft and yielding material such as felter, are engaged with the lower face of the two cassette spool driving gears PL1 and PL2, respectively.

Cassette spool driving gears PL1 and PL2 are a part of the cassette tape recorder and they are so mounted as to rotate freely about corresponding axes AP1 and AP2 carried by inner face L2 of bottom wall PF of frame T of the tape recorder and the cassette spools on which the magnetic tape is wound are fitted over the hub portion of these driving gears PL1 and PL2.

It should be noted at this point (FIG. 2) that flywheel movement transmission device 50 is supported by pin 51 on the upper face of offset portion 52 so that the end gear is at the same level as the toothed periphery of the base of cassette spool driving gears PL1 and PL2.

Before describing the operation of the movement transmission unit according to the invention, it should be mentioned that flywheel movement transmission device 50 is the object of the copending U.S. Ser. No. 2,470 filed Jan. 10, 1979 of the same applicant and, accordingly, the structure and operation thereof will be described herein only as far as they are necessary to illustrate the operation of the unit according to this invention. Thus, it will be sufficient to say that flat support 54 rotates limitedly upon each change of direction of rotation of gear 53.

With the arrangement described and illustrated above flat support 54 will force gear 55 to mesh with driving gear PL1 and remain meshed therewith according to a counterclockwise rotation of gear 53, while flat support 54 will force 53 to mesh with driving gear PL2 and remain meshed therewith according to a clockwise rotation of gear 53.

It is evident that the direction of rotation of gear 53 depends on the following two factors:

(1) the direction of rotation of flywheel 10;

(2) the positioning of flat support 20 that determines the direction of rotation of gear 53 in respect of the drive chain between flywheel 10 and gear 53.

It should also be noted now that in the tape recorders provided with reverse operation the direction of rotation of the flywheel is changed according to the direction of rotation of the motor of the tape recorder that is reversable.

For the description of the operation, once established the direction of rotation of flywheel 10, the direction of rotation of gear 53 is determined only by the drive chain transmitting the movement of the flywheel.

Figure 4C:
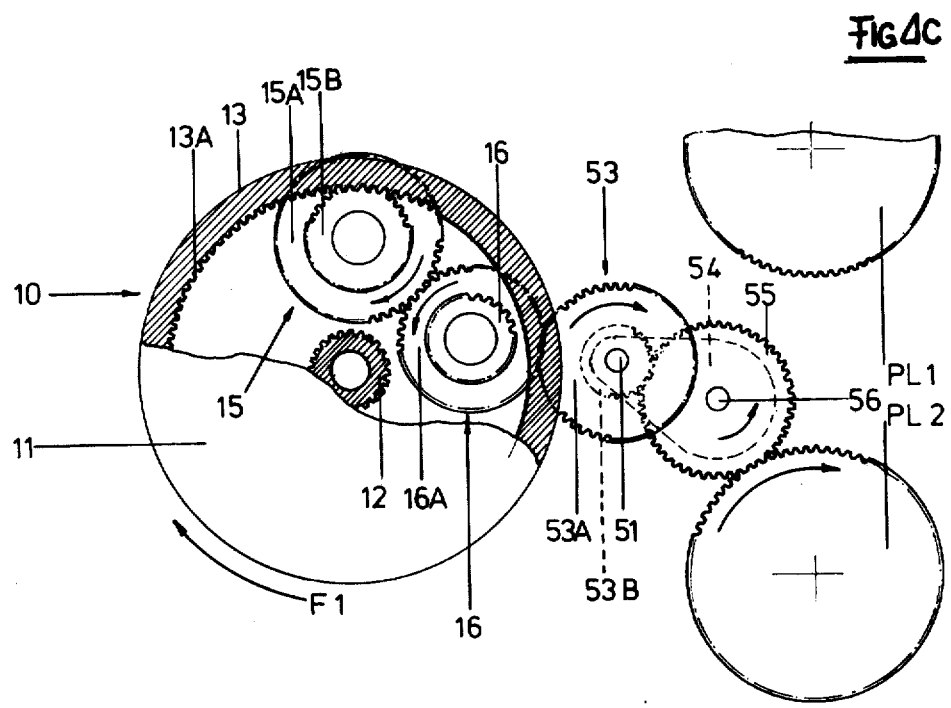
FIG. 4C is a similar view of the unit in the arrangement for the fast rewind operation.

It should also be noted that the shape and dimension of slots 21 and 22 of flat support 20, the shape and dimension of slot 34 of head 33 of lever 30 receiving support axis or pin 18 of double gear 15, the structure of lever 30 and, finally, the structure and arrangement of control mechanism 60 are such that, once established the clockwise direction of flywheel 10, the following cases may occur:

(A) with lever 61 in the central position also lever 30 will be in a central position, so that the position of flat support 20 is such to create the condition shown in FIG. 4A;

(B) with lever 61 moved to the left in FIG. 1 also lever 30 will be in a position correspondingly rotated about pin 31, so that the position of flat support 20 is such to create the condition shown in FIG. 4B; and (C) with lever 61 moved to the right in FIG. 1 also lever 30 will be in a position correspondingly rotated about pin 31, so that the position of flat support 20 is such to create the condition shown in FIG. 4C.

As already mentioned above FIGS. 4A, 4B and 4C have been drawn supposing that flywheel 10 rotates clockwise (arrow F1). In these figures:

FIG. 4A shows the arrangement of the gear chain for transmitting the normal forward movement (from flywheel 10 to cassette spool driving gear PL1) and it can be noted that flat support 20 (here omitted) assumes such a position that the flywheel movement is transmitted to gear wheel 15A by toothed hub 12 of flywheel 10;

FIG. 4B shows the arrangement of the gear chain for transmitting the fast forward movement (of course again from flywheel 10 to cassette spool driving gear PL1, but with a different gear ratio) and it can be noted that flat support 20 assumes such a position that the movement of inner ring gear 13A of flywheel 10 is transmitted to pinion 16B, gear 15 rotating idle;

FIG. 4C shows the arrangement of the gear chain for transmitting the fast rewind movement (from flywheel 10 to cassette spool driving gear PL2 with the same gear ratio of the fast forward movement of FIG. 4B) and it can be noted that flat support 20 assumes such a position that the movement of inner ring gear 13A of flywheel 10 is transmitted to pinion 15B.

It is necessary to note here the fact that for the normal forward operation (tape movement at 1.87 in/sec) the movement is transmitted by gear wheel 15A on hub 12 of flywheel 10 (which flywheel always rotates at a constant speed), while for the fast forward and rewind operations the movement is transmitted by pinions 15B and 16B, respectively, on ring gear 13A of flywheel 10. It is evident that the ratio between the diameter of hub 12 and the diameter of gear wheel 15A and between the diameter of ring gear 13A and the diameter of pinions 15B and 16B determines the speed difference necessary for the two operation modes of the cassette tape recorder.

It will be evident that "mutatis mutandis" the same will occur when the tape recorder operates in reverse, that is with flywheel 10 rotating in the opposite direction, by suitably operating lever 61.

It should be noted now that the rotation of lever 30 to the right or to the left, caused by the operation of lever 61 of control mechanism 60, besides being used to suitably move flat support 20 in respect of flywheel 10 in order to cause ring gear 13A thereof to mesh with pinions 15B and 16B, thus obtaining the fast forward or rewind operation of the tape recorder, is also used to suitably move the magnetic head (or heads) and the pinch roller away from the cassette tape during this fast forward or rewind operation.

To this aim, as already mentioned above, the magnetic head and the pinch roller (not shown) are supported by oscillating support 90 (FIGS. 1 and 6) pivoted on pin 91 integral with inner face L2 of bottom wall PF of frame T of the tape recorder. End 40 of lever 30 opposing head 33 is forked having two arms 41 and 42 and a V-shaped central notch 43 therebetween. The apex of notch 43 comprises straight lengths 46A and 46B, which are less inclined than the remaining portion of the inner edges of arms 41 and 42, joined by a length having the shape of a circumferential arc 47.

Notch 43 is adapted to cooperate with pin 93 carried by the lower face of support 90 that is biassed by traction spring 92 anchored to pin 94 integral with inner face L2.

In the position of fast forward (both normal and in reverse) lever 30 is in the position traced in full line in FIG. 6 with pin 93 received within apex 47 of V-shaped notch 43 of end 40 thereof and support 90 is in the position, also traced in full line in FIG. 6), wherein the magnetic head (not shown) is engaged with the cassette tape (not shown) and the pinch roller is against the capstan (not shown).

However, when lever 30 will be forced to rotate about pin 31 to move flat support 20 to the position where the movement of the flywheel is transmitted to one or the other cassette spool driving gears for the fast forward or rewind operations, also end 40 thereof rotates correspondingly (either clockwise or counterclockwise) and, accordingly, pin 93 of oscillating support 90 is forced to disengage from apex 47 of notch 43.

Furthermore, the length of arms 41 and 42 and the inclination of end edges 44 and 45 thereof are such that pin 93 will stop against one or the other of these end edges and, being the latter more advanced than apex 47 of V-shaped notch 43, in both cases oscillating support 90 is forced to rotate counterclockwise about pin 91, against the bias of spring 92, thus moving to the position traced in dotted line in FIG. 6 where the magnetic head and the pinch roller are remote from the tape and the capstan, respectively.

It is necessary to note here the inclination of sides 46A and 46B of apex 47 of notch 43 allowing pin 93 to move easily out of notch 43 after the rotation of lever 30. It is also useful to note that pin 93 is the only centering element of the unit, that is pin 93 is the only element that, when received within apex 47 of notch 43, allows the whole unit to be in the normal central position.

As far as the operation of the braking device is concerned it should be said that, in general, while during the normal operation of the tape recorder the braking of the rotation of the spool from which the tape is unwound is desirable, during the fast forward and rewind operations this braking of the spool from which the tape is unwound is essential and to obtain this it is necessary to brake the rotation of the corresponding cassette spool driving gear.

The braking device according to the invention automatically performs this function always braking the device gear corresponding to the spool from which the tape is unwound, both during the normal (and reverse) operation and during the fast forward and rewind operations.

As a matter of fact, since the tape is placed downward in the figure, for the normal movement where lever 61 of control mechanism 60 is in the central position and, accordingly, also lever 30 is in the central position traced in full line, when the cassette spool driving gears rotate in the direction of arrow F3, the friction of pads 83A and 83B against the bottom of these driving gears will force lever 82 to rotate clockwise in respect of disk 81 that remains stationary, being connected to lever 30 through pin 48 received in opening 85. This rotation of lever 82 will force conical embossment 87B of lever 82 to fit under adjacent slightly raised edge 88B of opening 86B of disk 81. Thus, arm 82B of lever 82 will be forced to lower disengaging pad 83B from the bottom of cassette spool driving gear PL2, while arm 82A of this lever remains raised leaving pad 83A engaged with cassette spool driving gear PL1 that is thus braked thereby.

The opposite will occur for the rotation in the direction of arrow F4 during which the other cassette spool driving gear is braked.

The automatic operation of braking device 80 during the fast forward and rewind operations of the tape recorder is due to the rotations of lever 30 under the control of lever 63, owing to pin 48 received in opening 85 of disk 81.

As a matter of fact, the rotation of lever 30 in one or the other direction will cause disk 81 to rotate in respect of plate 82 and, accordingly, one of the two arcuated edges (either 88A or 88B) of the openings (85A, 85B) engages with the corresponding conical embossment (87A, 87B) carried by brake applying plate 82. This will force the corresponding arm of plate 82 to lower, thus moving the braking pad (83A, 83B) away from the corresponding cassette spool driving gear (PL2, PL1), so that only the other cassette spool driving gear (PL1, PL2) remains braked.

It is necessary to note here the presence of pins 95 and 96 carried by inner face L2 of bottom wall PF of the tape recorder, which pins limit the angular movements of elastic brake applying plate 82.

It will be evident from the foregoing that the invention as described and illustrated fully attains the above-mentioned objects providing a reliable strong effective and very compact unit.

I claim:

1. In a magnetic tape recorder provided with normal and reverse operation comprising: a frame comprising a bottom wall having an inner side and an outer side and provided with an opening, at least one side wall and a front wall; a driving motor adapted to rotate in one direction for the normal operation and in the opposite direction for the reverse operation; two cassette spool driving gears, adapted to receive the spools on which said magnetic tape is wound, supported by two parallel axes protruding from said inner side of said bottom wall; a flywheel supported by an axis protruding from said outer side and connected to said motor of said tape recorder; and, a support for the magnetic head and the pinch roller of said tape recorder pivoted on a pin protruding from said inner side and biassed by elastic means towards a position where said magnetic head and said pinch roller are engaged with said tape, a unit for transmitting the movement of said flywheel to said cassette spool driving gears comprising:

(a) a drive system automatically operating in normal forward and in reverse and in fast forward and rewind, both for the normal forward and reverse operations, comprising: a first and second double gears each having a gear wheel of a given diameter and a pinion of smaller diameter integral and coaxial therewith, said gear wheel and pinion being meshed with each other and supported by two axes carried by a movable flat support provided with means for the restrained movement on said outer side of said bottom wall having matching means, so as to assume three different positions, i.e. a first position for said normal forward, a second position for said fast forward and a third position for said fast rewind; an operation lever for said flat support and said support for said head and pinch roller; and, a control mechanism for said operation lever and a transmission output device of said drive system meshed with said second double gear and adapted to mesh with one or the other of said cassette spool driving gears and remain meshed therewith according to the direction of rotation of said second double gear; and (b) a braking device adapted to automatically brake, both in normal forward and in reverse and in fast forward and rewind, the cassette spool driving gear receiving the spool from which said magnetic tape is unwound, said braking device comprising: an elastic plate pivoted in the middle between said two cassette spool driving gears, so as to make limited angular movements, and having each end provided with a braking member pushed against the bottom of one of said cassette spool driving gears by the resilience of said plate; and, a disk pivoted together with said plate so as to move angularly in respect thereof, and provided both with engaging means, adapted to engage with matching engaging means carried by said operation lever of said drive system, said means forcing said disk to rotate with said lever, and with engaging means adapted to engage with matching engaging means carried by one or the other arm of said elastic plate, according to the direction of rotation of said plate, to move said one of said arms and move said braking member carried by said arm away from the corresponding cassette spool driving gear.

2. The unit according to claim 1, wherein said operation lever is pivotally mounted on said frame and comprises a head, a body and a forked end, said head carrying slot-shaped engaging means adapted to engage the axis of one of said double gears carried by said flat support, said body having slot-shaped means adapted to engage said control mechanism and pin means adapted to engage said braking device and said forked end having a first and second arms with a V-shaped notch therebetween having an apex comprising two converging end lengths less inclined than the sides of said arms and a connecting length having the shape of a circumferential arc adapted to cooperate with a pin carried by said support for said magnetic head and pinch roller, so that said support is in the position where said magnetic head and pinch roller are engaged with said tape when said pin is received within said V-shaped notch and said support is moved away from said position when, against the action of said elastic means, said pin is disengaged from said notch.

3. The unit according to claim 1, wherein said flywheel comprises a disk having a toothed hub of a given axial dimension and a peripheral circular rim of a smaller axial dimension provided with inwardly directed teeth, said hub and rim protruding from a same side of said disk so that a free space having tha shape of a circular crown is formed between said toothed hub and said circular rim or ring gear.

4. The unit according to claim 2, wherein said double gear means are supported by said flat support so that the pinions thereof are received within said free space of said flywheel, while said gear wheels integral therewith are out of said space, and wherein said means for the restrained movement of said flat support carried thereon and on said bottom wall and slot-shaped means of said head of said operation lever are such that: in the first position of said flat support, for said normal forward operation, the movement of said flywheel is transmitted by said toothed hub thereof to the gear wheel of one of said double gears; in the second position of said flat support, for said fast forward operation, the movement of said flywheel is transmitted by said peripheral circular rim or ring gear to the pinion of one of said double gears; and, in the third position of said flat support, for said fast rewind operation, the movement of said flywheel is transmitted by said ring gear to the pinion of the other of said double gears.

5. The unit according to claim 1, wherein said control mechanism comprises a first lever pivotally supported by a pin carried by said frame, a second lever pivoted on said frame so as to move angularly about a pin placed at 90° in respect of said pin of said first lever, said second lever being engaged with said first lever at one end, and a third lever supported on said frame so as to move angularly about a pin parallel to said pin of said first lever, said third lever being engaged with the other end of said second lever and provided with pin means adapted to cooperate with said slot-shaped means carried by said body of said operation lever, said parts being so arranged that the angular movements of said first control lever are transmitted to said operation lever so that the angular position of said first control lever establishes the angular position of said operation lever.

6. The unit according to claim 1 wherein said engaging means carried by said disk and adapted to engage with matching engaging means carried by said operation lever comprise a radial opening adapted to receive said pin integral with said body of said lever.

7. The unit according to claim 1, wherein said engaging means carried by said one and other arms of said elastic plate comprise conical embossments, while said matching engaging means carried by said disk comprise arcuated radial edges forming a certain angle with the generating lines of the conical surfaces of said embossments and two openings having the shape of a circular segment formed on said disk in diametrically opposite positions.

* * * * *